3,522,271
METHOD OF MAKING N,N'-ARYLENE-
BISMALEIMIDES
James Kalil, Wilmington, Del., assignor to E. I. du Pont
de Nemours and Company, Wilmington, Del., a corporation of Delaware
No Drawing. Filed June 14, 1966, Ser. No. 557,355
Int. Cl. C07d 27/16
U.S. Cl. 260—326.3       4 Claims

ABSTRACT OF THE DISCLOSURE

N,N'-arylene-bismaleimides are prepared by mixing an arylene diamine and maleic anhydride in the presence of an alkali metal salt of a lower aliphatic carboxylic acid and a polar organic solvent to form an N-arylmaleamic acid precursor and mixing therewith a lower fatty acid anhydride.

---

This invention relates to an improvement in the manufacture of N,N'-arylenebismaleimides.

Certain N,N'-arylenebismaleimides, particularly phenylene bismaleimides have long been known as curing agents for elastomers.

In U.S. Pat. 2,444,536 there is taught a general method for making aryl maleimides by heating an N-aryl maleamic acid in the presence of acetic anhydride and fused sodium acetate.

U.S. Pat. 3,127,414 describes an improvement on the above process, yielding an improved product in good yield by conducting the above reaction in certain solvents, notably lower alkyl sulfoxides, lower aliphatic ketones or lower aliphatic carboxamides.

A disadvantage to the process taught in U.S. Pat. 3,127,414 is that the solvents are expensive, and that relatively large amounts of such expensive solvents are required to maintain the reaction medium in a fluid condition suitable for satisfactory economic handling.

It has now been discovered that if the N-arylmaleamic acid precursor is formed in the presence of an alkali metal salt of a lower aliphatic carboxylic acid (e.g. sodium acetate) used in a larger amount than is customarily employed in the ring closure of an N-arylmaleamic acid, and in the presence of the selected reaction solvents, that the ring closure reaction can be conducted thereafter without isolation of the N-arylmaleamic acid intermediate and in the presence of substantially less solvent than is otherwise necessary.

Accordingly this invention may be defined as a process comprising the steps of:

(i) Reacting an arylene diamine and maleic anhydride in a polar organic solvent selected from lower aliphatic ketones, lower alkyl sulfoxides and lower aliphatic carboxamides in the presence of from 0.2 to about 3 moles of an alkali metal salt of a lower fatty acid per mole of said arylene diamine at a temperature of from 20 to 80° C. to form a mixture containing an N,N'-arylenedimaleamic acid.

(ii) Adding a lower fatty acid anhydride to said mixture and continuing to heat at a temperature of from 35 to 80° C. to form an N,N'-arylenebismalaimide and (iii) Isolating said N,N'-arylenebismaleimide.

The solvents which can be employed are those taught by U.S. Pat. 3,127,414. In contrast to the disclosure of U.S. 3,127,414 only 20 to 50% of the amount of solvent required by the process taught therein is required in the present process to maintain the reaction mass in an acceptably fluid condition. The exact manner in which the fatty acid salt increases the solubility of the arylene-maleamic acids is not known with certainty but probably is related to the partial formation of alkali metal salts of the arylenedimaleamic acids and/or a change in the nature of the solvent in the presence of dissolved ionic material.

Polar organic solvents which are useful in this improved process include lower alkyl sulfoxides, lower aliphatic ketones and lower aliphatic carboxamides, the latter being represented by the formula:

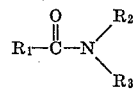

in which $R_1$, $R_2$ and $R_3$ may be hydrogen or $C_1$–$C_4$ alkyl and $R_2$ and $R_3$ may further be alkylene radicals which form a ring optionally containing O or S as hetero atoms, and $R_1$ and either $R_2$ or $R_3$ may further be alkylene radicals and form a ring which includes the amide linkage. Specific examples of solvents include dimethyl sulfoxide, diethyl sulfoxide, acetone, methyl formamide, N-methyl and N,N-dimethylformamide, N,N-dimethylacetamide, N-methyl pyrrolidone, N-formylmorpholine and N,N-diethylformamide. Acetone, formamide, N,N-dimethylformamide and N,N-dimethylacetamide are preferred solvents. Only solvents which are liquid at the operating temperatures required by the present process are useful. Obviously mixtures of solvents with suitable freezing points can be used and such mixtures may include materials which in the pure state would be solids at the temperatures used in this process.

The quantity of solvent required to operate the present process in commercial equipment cannot be specified exactly as it depends on the particular solvent and the dimaleamide being prepared as well as such factors as temperature and the concentration of the alkali metal fatty acid salt. In general, however, 1 to 2 parts of solvent per part of N,N'-arylenedimaleamic acid is sufficient to provide a readily workable reaction medium throughout both steps of the synthesis. In the case of N,N'-m-phenylene- and N,N'-m-tolylene dimaleimides, which are of special interest as elastomer curing agents, a process using about 1 part of formamide per part of dimaleamic acid gives good operability, high productivity, and good product quality.

Sodium acetate and acetic anhydride are preferred in this process as the anhydrous alkali metal salt of the fatty acid and as the lower fatty acid anhydride because of availability and low cost. Other alkali metal salts of lower fatty acids, R'COOH, where R' is $C_1$–$C_4$ alkyl, may be used. Representative salts include sodium acetate, sodium propionate, lithium acetate and potassium isobutyrate. In the case of the anhydrides, $(RCO)_2O$, R may be $C_1$–$C_4$ alkyl.

The quantity of fatty acid alkali metal salt required in the diamine/maleic acid reaction step to provide good operability and high over-all yield ranges from 0.20 to about 3.0 moles of salt per mole of arylene diamine. If lesser amounts of the salt are used, solvent requirements are increased and if additional salt is not added to the second step in which ring closure to the dimaleimide occurs, the over-all yield is lowered. Greater amounts of alkali metal can be used but offer no additional benefit. It is preferred to use from about 1.0 to 3.0 moles of the fatty acid salt per mole arylene diamine. There is no yield advantage in adding amounts of salt above the preferred range to the ring closure step. The preferred range also minimizes solvent requirements. Ideally, the alkali metal salt should be in finely divided form to promote its solution in the reaction medium.

At least a slight excess of fatty acid anhydride should be used in this process to insure complete ring closure. Preferred amounts range from 2.05 to about 2.5 moles of anhydride per mole of arylenedimaleamic acid. In the preparation of the dimaleamic acid, about 2.0 to 2.2 moles of maleic anhydride should be used for each mole of arylene diamine.

The temperature employed in the present process may range from about 20° C. to 80° C. for the diamine/maleic anhydride reaction and from about 35° to 80° C. for the ring closure step. Lower temperatures than those set out by the above ranges may be used but are inconvenient because of low reaction rates and reduced solubilities. Higher temperatures than 80° C. may be used but in general yield products of lower quality. Temperatures in the range of 35° C. to 55° C. for both steps give convenient reaction rates and yield high quality products.

As previously indicated, the N,N'-arylenedimaleimides produced by the present process can be isolated by drowning the reaction mass in water. About 3–10 volumes of water can be used per volume of reaction mass. Greater amounts of water may however be used. In the case of solvents other than the carboxamides, the solvent may interfere with the isolation if large volumes of water are not used. If the use of large volumes of water is inconvenient, distillation of a part of the solvent during the ring closure step permits the use of less water.

The present process is particularly advantageous for producing N,N'-arylenedimaleimides derived from phenylene diamines and naphthalene diamines and their derivatives. Illustrative are 1,3-phenylenediamine, 2,4- and 2,6-tolylene diamines, 2,5-dichloro-1,4-phenylenediamine, cumene diamine and 1,4- and 1,8-naphthalene diamines. The process may further be used with arylene diamines of the type illustrated by methylene dianiline and its derivatives in which the amine groups are on separate benzene nuclei. The methylene group in compounds of this type may also be replaced by bivalent —S—, —O— or —$SO_2$— groups or even be absent as is the case in benzidines. The process is also applicable to aromatic monoamines such as aniline, toluidines and chloroanilines. Aliphatic mono- and dimaleimides may be prepared by the present process but the yields obtained are much lower because of the tendency of aliphatic maleamic acids to chain-extend rather than ring-close.

This invention is illustrated by the following examples.

EXAMPLE 1

A solution of 20 parts of tolylene diamine (80% 2,4-isomer; 20% 2,6-isomer) and 15 parts of anhydrous sodium acetate in 45.3 parts of formamide is prepared by mixing the ingredients at 70° C. These amounts are equivalent to 1.12 moles of sodium acetate per mole of diamine. The solution is cooled to 45° C. and 32 parts of maleic anhydride is added at a temperature of 45–47° C. The temperature is maintained at 48° C. for about 30 minutes following the maleic anhydride addition. At this point, a soft precipitate has formed and the consistency of the reaction mixture is similar to that of pea soup. No visible change in the consistency of the reaction mass takes place while it is held for an additional 80 minutes at 45–48° C. About 39 parts of acetic anhydride is then added and the temperature is maintained at 45° C. for 3 hours. The product is isolated by pouring the reaction mass into 600 parts of vigorously agitated water, collecting the resulting precipitate by filtration and drying in a 50° C. vacuum oven. A yield of 83.2% of theory is obtained. The product is a light brown solid. It is insoluble in aqueous sodium bicarbonate solution, indicating that the intermediate maleamic acid has cyclized to form a mixture of 2,4- and 2,6-tolylene bismaleimides.

EXAMPLE 2

The procedure of Example 1 is repeated with the exception that the quantity of anhydrous sodium acetate is increased to 24.4 parts. This is equivalent to 1.82 moles of sodium acetate per mole of tolylene diamine. After the addition of maleic anhydride, the reaction mass is a clear syrupy liquid and no precipitate forms. In other respects, the reaction proceeds in essentially the same manner as the reaction of Example 1. The yield of mixed 2,4- and 2,6-tolylene bismaleimides is 84%.

The following illustrates the prior art synthesis of tolylene dimaleamic acid in the absence of sodium acetate.

About 33.8 parts of maleic anhydride is added to a solution of 20 parts of tolylene diamine (80% 2,4-isomer; 20% 2,6-isomer) in 102 parts of formamide at 40° C. Almost immediately, the reaction mass sets to a solid and remains solid even though it is heated. About 10 minutes after the maleic anhydride addition, 53 parts of acetic anhydride and 15 parts of anhydrous sodium acetate are added. Even with the additional volume of liquid furnished by the acetic anhydride, the mass must be heated to 65° C. before the solids dissolve. After 70 minutes at 65° C., mixed 2,4- and 2,6-tolylene bismaleimides are isolated as in Examples 1 and 2.

It should be noted that the reaction mass of this example (after the maleic anhydride addition) is unmanageable even though the quantity of solvent is more than double the amount used in Examples 1 and 2.

EXAMPLE 3

About 32 parts of maleic anhydride is added to a solution of 17.7 parts of m-phenylene diamine and 15 parts of anhydrous sodium acetate in 45.3 parts of formamide at 45–48° C. Within a few minutes, a precipitate forms and the reaction mass changes to a thick, but manageable, slurry. About 15 minutes later, 42 parts of acetic anhydride is added and the mixture is held for 2 hours at 50° C. The product is isolated essentially by the procedure of Example 1. The yield of N,N'-m-phenylene bismaleimide is 88.3%. The product is a yellow solid which is not soluble in aqueous sodium bicarbonate solution, indicated that the dimaleamic acid has been cyclized to the bismaleimide.

EXAMPLE 4

A solution of 20 parts of tolylene diamine and 15 parts of sodium acetate in 38.2 parts of N,N-dimethyl formamide is formed by mixing the ingredients at 70° C. The resulting solution is cooled to 45° C. and 32 parts of maleic anhydride is added. The reaction mass remains fluid. About 15 minutes later, 42 parts of acetic anhydride is added and the mixture held for 3 hours at 44–47° C. The product is isolated by the procedure of Example 1. The bismaleimide is a yellow solid which is insoluble in bicarbonate solution.

Essentially identical results are obtained when N,N-dimethylformamide is replaced with an equal volume (44 parts by weight) of dimethyl sulfoxide.

EXAMPLE 5

About 32 parts of maleic anhydride is added at 50° C. to a solution of 20 parts of tolylene diamine (80%, 2,4-isomer, 20% 2,6-isomer) and 15 parts of anhydrous sodium acetate in 31.6 parts of acetone. A workable, uniform paste is obtained. About 10 minutes later, 42 parts of acetic anhydride is added and the mixture is heated to 80–85° C. at which temperature most of the acetone distills from the reaction mixture. The mixture is held for an additional 20 minutes at 80° C. and then the product is isolated essentially by the isolation procedure of Example 1. The resulting mixture of 2,4- and 2,6-tolylene bismaleimides is a light brown solid which is insoluble in bicarbonate solution.

EXAMPLE 6

A mixture of 20 g. of tolylene diamine (80% 2,4-isomer; 20% 2,6-isomer) and 15 g. of anhydrous sodium acetate in 45.3 g. of formamide is agitated in a 250 ml. flask at 70° C. until a solution is obtained. The solution is cooled to 50° C. and 32 g. of maleic anhydride is added over an 8-minute period during which the temperature is maintained at 45–50° C. Fifteen minutes after completion of the maleic anhydride addition, about 38 g. of acetic anhydride is added to the fluid reaction mass and the solution is held for an hour at 42–43° C. The product is isolated by adding the reaction mass to 1200 ml. of water agitated by an Appenbach homogenizer. The product is collected by filtration and dried in a 50° C. vacuum oven. The yield is 82% of theory of orange-brown crystalline material.

I claim:
1. A process for manufacturing N,N'-arylenebismaleimides consisting essentially of:
 (a) mixing an arylene diamine and maleic anhydride in a polar organic solvent in the presence of from 0.2 to 3.0 moles of an alkali metal salt of a lower fatty acid per mole of arylene diamine at a temperature of from 20° C. to 80° C. wherein the arylene diamine is selected from the group of 1,3-phenylenediamine; 2,4- and 2,6-tolylene diamines; 2,5-dichloro-1,4-phenylenediamine; cumene diamine; 1,4- and 1,8-naphthalene diamines; and methylenedianiline; the polar organic solvent is selected from the group of acetone; and lower alkyl sulfoxides and lower aliphatic carboxamides having the general formula:

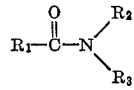

wherein $R_1$, $R_2$ and $R_3$ can be hydrogen or $C_1$–$C_4$ alkyl; and
 (b) adding about 2.05 to 2.5 moles of a lower fatty acid anhydride per mole of arylene-dimaleamic acid to the mixture and heating the mixture to a temperature of about 35° C. to 80° C.

2. Process of claim 1 in which said alkali metal salt of a lower fatty acid is present in an amount between 1.0 and 3.0 moles per mole of said arylene diamine.

3. Process of claim 2 in which said alkali metal salt of a lower fatty acid is sodium acetate.

4. Process of claim 3 in which said lower fatty acid anhydride is acetic anhydride.

References Cited
UNITED STATES PATENTS 3,127,414   3/1964   Cole et al. _____ 260—326.3

ALEX MAZEL, Primary Examiner

R. V. RUSH, Assistant Examiner